United States Patent
Fallert

Patent Number: 5,979,926
Date of Patent: Nov. 9, 1999

[54] MOTOR VEHICLE TRAILER

[76] Inventor: Christian Fallert, Badmatt 16, D-77887 Sasbachwalden, Germany

[21] Appl. No.: 08/596,863

[22] Filed: Feb. 9, 1996

[30] Foreign Application Priority Data

Feb. 10, 1995 [DE] Germany ............... 295 02 193 U

[51] Int. Cl.$^6$ .................................................. B62D 63/06
[52] U.S. Cl. ................ 280/401; 280/415.1; 280/491.3; 280/656
[58] Field of Search ........................ 280/400, 401, 280/402, 482, 491.1, 491.3, 38, 639, 640, 645, 652, 656, 655, 47.3, 47.21, 78, 63, 415.1, 416.1, 405.1; 296/27; 414/563

[56] References Cited

U.S. PATENT DOCUMENTS

| Re. 20,292 | 3/1937 | Brown | 280/401 |
|---|---|---|---|
| 2,416,492 | 2/1947 | Neeley | 280/652 |
| 2,518,410 | 8/1950 | Willis | 280/401 |
| 3,612,600 | 10/1971 | Salichs | 280/656 |
| 3,625,545 | 12/1971 | Somers et al. | 280/401 |
| 4,763,914 | 8/1988 | Lemmons | 280/401 |
| 4,786,073 | 11/1988 | Harper | 280/656 |
| 5,228,712 | 7/1993 | Speier | 280/401 |
| 5,368,325 | 11/1994 | Hazen | 280/656 |
| 5,570,898 | 11/1996 | Albert | 280/656 |

FOREIGN PATENT DOCUMENTS

| 2854305 | 6/1979 | Germany | 280/38 |
|---|---|---|---|

*Primary Examiner*—Anne Marie Boehler
*Attorney, Agent, or Firm*—Oblon, Spivak, McClelland, Maier & Neustadt, P.C.

[57] ABSTRACT

The present invention relates to a motor vehicle trailer, particularly for transporting two-wheeled vehicles, a drawbar of which is connected to a wheel axle by means of a lockable revolving joint or link joint. The revolving joint or link joint allows the drawbar to be pivoted with respect to the wheel axle in a pivot plane which is aligned substantially in parallel to said wheel axle. A hitch coupling member is mounted directly to the wheel axle.

2 Claims, 2 Drawing Sheets

MOTOR VEHICLE TRAILER

BACKGROUND OF THE INVENTION

1. Field of the Invention

The present invention relates to a motor vehicle trailer, particularly for transporting motorized two-wheeled vehicles such as motorbikes, mopeds, motor scooters, etc.

2. Discussion of the Background

Motor vehicle trailers of this kind usually have one single axle onto which a drawbar is welded so as to be torsionally stiff and deflection resistant. At the end of the drawbar a coupling head is provided, which is engageable with a correspondingly shaped hitch ball on the rear end of a motor vehicle and can be locked there. Trailer superstructures are fastened on the axle so loads which shall be transported by means of such trailers are automatically placed such that the center of gravity thereof substantially lies above the trailer axle in order to minimize the load on the coupling piece mounted on the motor vehicle. This trailer concept already results from the respective legal provisions which only permit a maximum dead load of about 50 kg presently on the hitch ball. Furthermore, the maximum speed allowed to be driven with such trailers is limited by the law to 80 km/h at present.

Accordingly, the above-mentioned provisions result in several disadvantages when using motor vehicle trailers.

If loads are transported from one place to another by means of such a motor vehicle trailer, the motor vehicle driver is also forced to drive at the maximum admissible speed of 80 km/h when returning with the unloaded trailer. Besides, he has to accept all inconvenience regarding the capacity of maneuvering and handling the motor vehicle, which occur due to the coupled empty trailer.

SUMMARY OF THE INVENTION

The object of the invention is the improvement of the efficiency and functionality of a generic motor vehicle trailer.

According to the invention, this problem is solved by a motor vehicle trailer which is foldable.

Accordingly, the invention provides a motor vehicle trailer, particularly for transporting two-wheeled vehicles, comprising a drawbar for coupling said trailer to a motor vehicle and a wheel axle, said drawbar being rotatably supported in a central portion of the wheel axle and the revolving or link joint provided therefor allows a pivoting of the drawbar with respect to the wheel axle in a pivot plane which is parallel to the wheel axle. In this way, the drawbar can be transferred from a drawing position for the transportation of a load by suitable twisting of the drawbar with respect to the wheel axle into a compact position in which the whole trailer, when empty, may be taken along practically in or closely on the motor vehicle itself, i.e. without the wheels of the trailer having to touch the road. In this way, for example, the normal travelling speed of the motor vehicle can be driven when returning from transporting a motorcycle without any legal provisions having to be considered.

A further embodiment provides that the drawbar consists of a carrier member, which is supported on the wheel axle by means of the revolving joint, and a tension/thrust member, which is connected to the carrier member by means of a hinged joint or a screwed plug or a telescopic piece and has a coupling piece, preferably a ball-end retainer or a coupling head, at a free end thereof. This makes it possible to reduce the overall length of the drawbar before it is taken into the compact position in which it aligns substantially in parallel with the wheel axle, by twisting of the carrier member.

It is further provided that the carrier member is formed as a pedestal-like substructure on its bottom side extending toward the wheel axle, the central portion of said substructure being supported on the wheel axle by means of a pivot pin. This makes it possible to maintain the length of the carrier member without regard to the wheelbase because, when the carrier member is rotated, it pivots over the trailer wheels without touching them.

A further advantageous embodiment of the subject-matter according to the invention provides that there is a supporting component in the form of a bottom plate or a guide rail which is provided as a bearing for a load to be transported. It is intended that the supporting member is connected to the bearing member by means of a hinged joint, a screwed joint or a telescopic mechanism. This measure makes it possible to convey the supporting member from a bearing position in which it serves as bearing for the transport load into a compact position by suitable pivoting, twisting or retracting, in which it comes to lie directly above or besides the supporting component. Finally, the supporting member including tension/thrust bar and supporting member is pivoted into the compact position and locked.

To this end, it is provided that, at the revolving or link joint, in particular the pivot pin, the drawbar or the bearing member can be twisted with respect to the wheel axle into the compact position, in which it is aligned substantially in parallel to the wheel axle with the tension/thrust member being positionable by the hinged joint, the screwed plug or the telescopic piece already directly above or besides the carrier member. Thus, the whole trailer is maintained as kind of closed system without any components having to be removed in the compact position.

It is finally provided that, after conveyance of the drawbar and the supporting component into their respective compact positions, the wheel axle can be supported on a hitch ball of a coupling piece mounted to a vehicle such that wheels of the trailer are lifted off the road. For this, an additional coupling piece, preferably a ball-head retainer is arranged, which is formed in a central portion of the wheel axle and engageable with the hitch ball of the coupling piece mounted to the motor vehicle for supporting the wheel axle. In this way, the trailer can be taken along outside the motor vehicle as a kind of trailer package on the coupling piece mounted to the motor vehicle without any stowage space, for instance in the trunk of the motor vehicle, being lost. It would, of course also be conceivable as an alternative to this embodiment that, after the loosening of the connection, the drawbar can be taken into such a position regarding the axle and can be fixed there that the coupling piece can be used on the drawbar itself for the a.m. support of the trailer package over the hitch ball mounted to the motor vehicle.

Further advantageous embodiments of the invention form the subject-matters of the remaining subclaims.

BRIEF DESCRIPTION OF THE DRAWINGS

In the following, the invention is explained in greater detail by means of a preferred embodiment with reference to the figures.

DISCUSSION OF THE PREFERRED EMBODIMENTS

Figure 1:
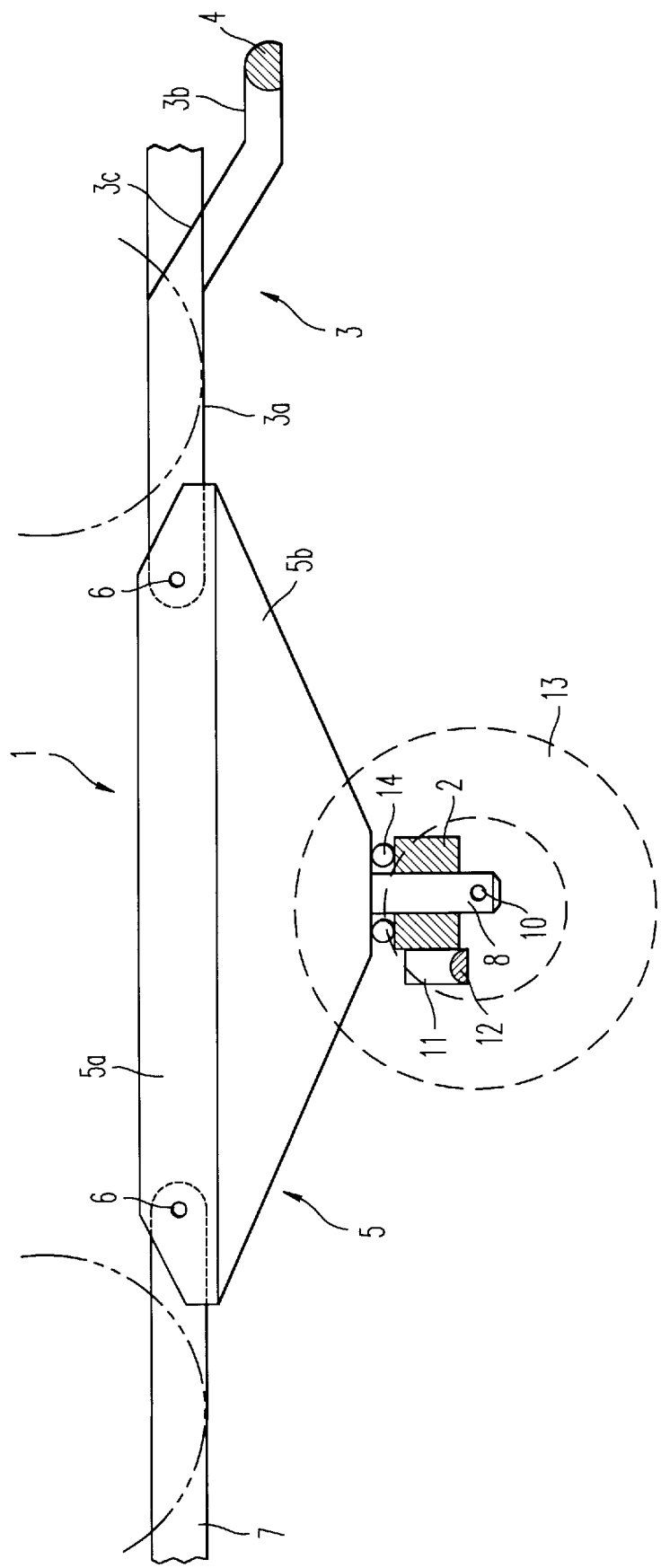
FIG. 1 shows a lateral view of an embodiment according to the invention for a motor vehicle trailer in a turned-out and unfolded state, i.e. in the traction position.

According to FIG. 1, in a preferred embodiment, the motor vehicle trailer according to the invention comprises a drawbar 1, which is rotatably fastened or supported in a central portion of an axis 2 of the trailer and, in its traction position, forms the deflection-resistant and torsionally stiff basic structure for a trailer structure.

To this end, the drawbar 1 consists of a front tension/thrust member in the form of a tension/thrust rod 3 which has, at its front end (right end acc. to FIG. 1), a ball-head retainer or a coupling head 4 for coupling the trailer onto a hitch ball mounted to the motor vehicle, which is not shown. According to FIG. 1, the tension/thrust rod 3 is bent downwards to form two partial pieces 3a, 3b lying at the height distance to each other and running in parallel to each other, said partial pieces being connected by a central piece 3c. In this embodiment, the upper partial piece 3a is provided in the form of a wheel guide rail, said guide rail serving as a first bearing of a two-wheeled vehicle to be transported. It would, however, also be conceivable to use a straight tension/thrust rod, to which an additional, channel-shaped wheel guide rail is screwed or welded instead of this particular embodiment.

At an end opposite to the ball head retainer 4 the tension/thrust rod 3 is connected to a carrier member 5 as a further component of the drawbar 1 by a hinged joint, said carrier member 5 being likewise formed with a guide rail 5a and at the bottom side of which a pedestal-like, trapezoid base part 5b is mounted in one piece. The connecting points 6 are selected such that, when the tension/thrust rod is unfolded, an end portion of the carrier member 5 serves as a stopper, so that an almost straight guide-rail surface is formed. To an end portion of the carrier member 5 opposite to the tension/thrust rod 3 a further rear guide rail 7 is linked in an aligned manner in the same way as the tension/thrust rod 3 such that, when the rear guide rail 7 and the front tension/thrust rod 3 are unfolded, a substantially straight guide rail surface or track having the length of a standard two-wheeled vehicle is produced.

Figure 2:
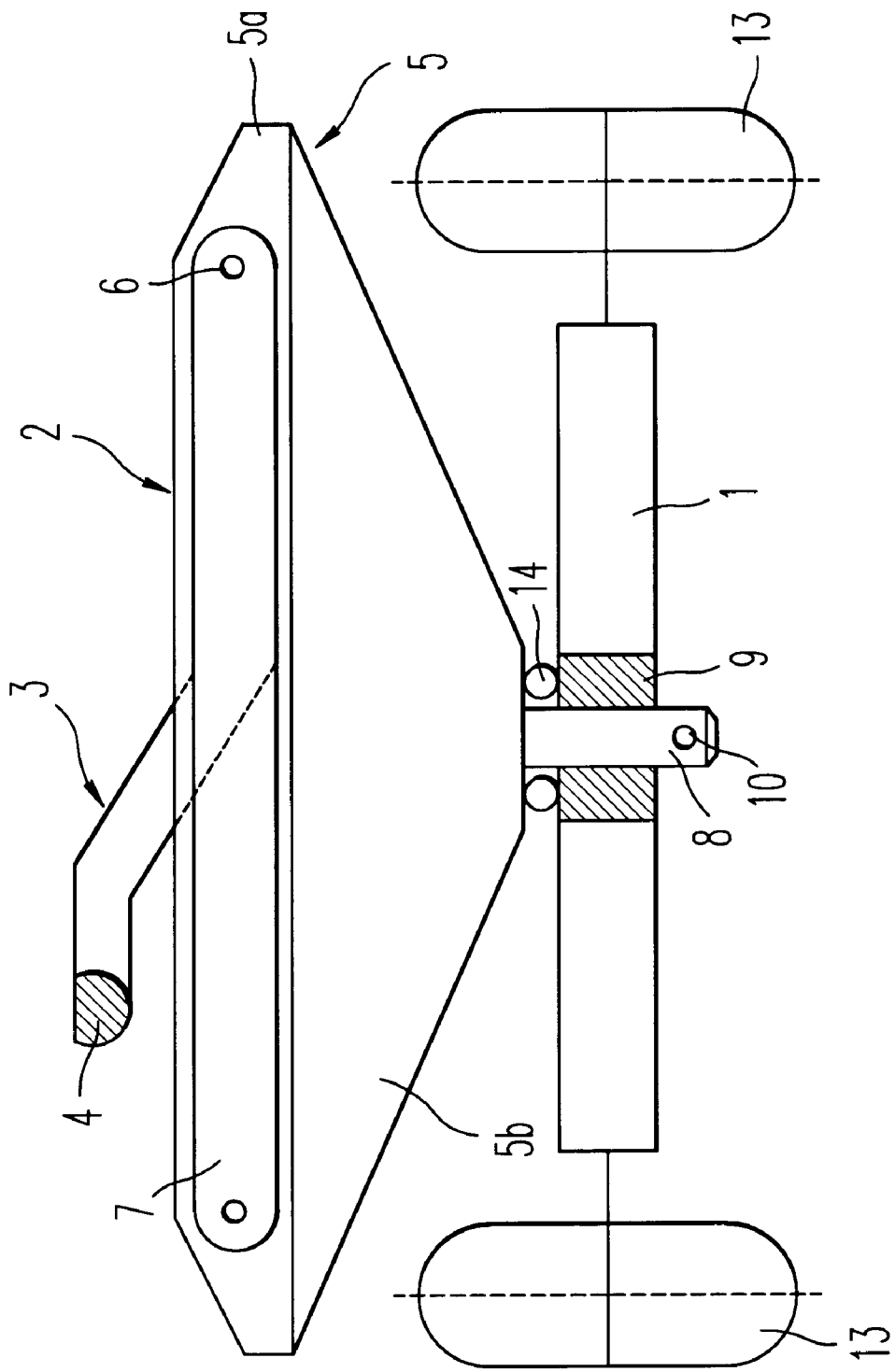
FIG. 2 shows a lateral view of the embodiment of the motor vehicle trailer according to the invention in the compact position in which the motor vehicle trailer can be taken along as a kind of luggage on the hitch ball mounted to the vehicle.

As can be seen from FIG. 2, in particular, a pivot pin 8 is arranged on the lower portion of the pedestal-like base part 5b, said pivot pin extending substantially perpendicularly to the guide rail surface of the carrier member 5 downwards. This pin 8 engages in a suitably dimensioned bearing eye 9 on the wheel axle 2 and is secured by means of a cotter pin 10 against unintentional retraction. In this embodiment, the bearing eye 9 is formed by a simple throughhole into the wheel axle 2. It is, however, also possible to fasten a single bearing eye as component laterally on the wheel axle 2. Yet, it is important that a free twisting of the carrier member 5 and, thus, of the whole drawbar 1 above the wheel axle 2 in the bearing eye 9 remains possible. Besides, the bearing eye 9 is formed with a locking device, e.g. a rotary brake or a locking pin, which is not further shown in the figures and by means of which the carrier member 5 can be locked in a traction position according to FIG. 1 and in a compact position according to FIG. 2.

As has already been hinted at above, the drawbar 1, i.e. in this case the front tension/thrust rod as well as the rear guide rail 7, are either designed as a channel section or in a round solid profile made of steel with a guide rail fastened thereto. For reasons of weight, also a hollow profile made from a lighter material, such as e.g. an aluminium alloy having a comparable stiffness, could be chosen, to which a guide rail, preferably made of an artificial resin composite is fastened.

According to FIG. 1, the axle 2 further has, in its central portion, a connection piece 11 or a step projecting perpendicularly to the axle the outer end portion of which is formed as an additional coupling head 12. The additional coupling head 12 (second coupling member) is therefore connected to the wheel axle 2 independently of the carrier member 5 (coupling part). Wheels 13 are supported on the ends of the axle 2 itself the centers of rotation of which are substantially arranged axially to the axle 2 according to this embodiment. It remains to be mentioned that the carrier member 5 or the upper guide rail 5a thereof substantially has the length corresponding to the track width of the trailer such that the provision of the pedestal-like base part 5b makes the carrier member 5 in its twisted compact position project over the wheels 13 of the trailer.

In the following, the functioning and the operation of the invention are explained in greater detail by means of FIGS. 1 and 2:

FIG. 1 shows the trailer according to the preferred embodiment in its untwisted and folded-out state, i.e. also in a traction position. As can be seen from FIG. 1, the front tension/thrust rod 3 as well as the rear guide rail 7 are substantially held in alignment with each other by the stops formed by the respective end portions of the carrier member such that an almost straight guide rail surface consisting of the rear guide rail 7, the carrier member 5 as well as the upper partial piece 3a of the front tension/thrust rod 3 is formed. In this embodiment the sole connection between the drawbar 1 or the carrier member 5, respectively, and the wheel axle 2 consists in the shown pivot pin including a possibly inserted axial ball bearing 14 with the pin 8 being inserted into the bearing hole 9 made in the side of the axle.

When transporting a two-wheeled vehicle, considerable transverse acceleration forces have to be expected, which would lead to the pin 8 being torn off. To avoid this, non-depicted steadying struts or simple eyes may optionally be arranged on both sides of the carrier member on the wheel axle, by means of which the lateral forces may be introduced into the axle either by the struts themselves or by the anchoring ropes conducted through the eyes.

In order to fold the trailer according to the invention to a compact trailer package, first the rear guide rail 7 and subsequently the front tension/thrust rod 3 are folded at the hinge points 6 on the carrier member 5 and, thereon, e.g. an elastic traction rope or the like is fixed by means of non-depicted fixing agents. Then, the locking device is loosened at the bearing eye 9 on the side of the axle, and the carrier member 5 with the rear guide rail 7 arranged thereon and the tension/thrust rod 3 is rotated into the compact position according to FIG. 2, in which the guide rail 5a of the carrier member 5 is aligned substantially in parallel to the wheel axle 2 above the same. By suitable actuation of the locking device, the carrier member 5 is finally fixed in this position on the axle 2. In this way, the folded and twisted trailer package can be coupled at the second coupling head 12 on the hitch ball mounted to the motor vehicle and can be tilted upward over the coupling piece mounted to the vehicle such that the wheels 13 no longer touch the road.

It would seem to be obvious to a person skilled in the art that, instead of the above mentioned hinged joints 6 between the carrier member 5 and the tension/thrust rod 3 or the rear bearing member 7, respectively, also a telescopic mechanism, bayonet catch or a similar connection can be provided, which allow a shortening of the overall length of the trailer by suitably folding or retracting the front and rear members.

According to the above-described embodiment, the wheels 13 of the trailer are supported on the trailer axle 2 itself such that, when folded upwards, the axle 2 as well as the wheels 13 come to rest on the hitch ball mounted to the vehicle. Hereby, it is achieved that a sufficiently large distance can be maintained between the wheels 13 and the vehicle in order to prevent the wheels 13 from rubbing on the vehicle body. However, the instable position of the trailer package formed therein has to be compensated by additional struts between the axle 2 and the coupling piece mounted to the vehicle, which are not shown in the figures.

In order to facilitate the handling regarding this last-mentioned problem, it is alternatively possible that the wheels 13 are simply displaced in parallel to the axle 2 substantially in the direction of the second receiving piece 11 to a position behind the additional coupling head 12 and are connected to the axle 2 by means of an extension arm, respectively. This design allows the center of gravity of the folded trailer package in its turned-up state, which center of gravity is decisively influenced by the wheels 13, to be displaced in its height even under the hitch ball mounted to the vehicle such that a stable position on the coupling piece mounted to the vehicle is reached. Accordingly, with this alternative solution, struts for supporting the trailer package can be left out and can be replaced optionally by belts for preventing pendular movements of the package on the hitch ball.

In conclusion, reference is made to the fact that the principle according to the invention is described above is not exclusively suited for trailers for transporting motorized two-wheeled vehicles. It may, of course, also be used with trailers for transporting bicycles, boats, or conventional loads such as closets and the like. In such cases, a corresponding constructional adaptation of the load support components, i.e. specifically of the above-described guide rails, into suitable receiving devices would have to be effected without anything being changed in the operation of the trailer according to the invention.

The invention relates to a motor vehicle trailer, in particular for transporting two-wheeled vehicles, wherein a drawbar is connected to a wheel axle by means of a lockable revolving joint or hinged joint. This revolving joint or hinged joint allows the drawbar to be pivoted with respect to the wheel axle in a pivot plane which is aligned substantially in parallel to the wheel axle.

I claim:

1. A foldable motor vehicle trailer comprising:
    a drawbar having a first coupling member configured to couple to a matable part of a motor vehicle;
    a carrier member connected to the drawbar and configured to carry a load;
    a wheel axle on which running wheels are mounted, said carrier member being held to said wheel axle via a lockable swivel joint; and
    a second coupling member connected to said wheel axle independently of said carrier member and configured to couple to the matable part of the motor vehicle.

2. The foldable motor vehicle trailer of claim 1 wherein said first coupling member is located at one end of said drawbar, wherein another end of said drawbar is pivotally connected to said carrier member.

* * * * *

UNITED STATES PATENT AND TRADEMARK OFFICE
CERTIFICATE OF CORRECTION

PATENT NO. : 5,979,926
DATED : November 9, 1999
INVENTOR(S) : Christian Fallert

It is certified that error appears in the above-identified patent and that said Letters Patent is hereby corrected as shown below:

On the title page, item [30], Foreign Application Priority Data: should read --Feb. 10, 1995 [DE] Germany ..........295 02 193 --.

Signed and Sealed this

Thirtieth Day of January, 2001

Attest:

Q. TODD DICKINSON

Attesting Officer

Director of Patents and Trademarks